(12) United States Patent
Lee et al.

(10) Patent No.: US 11,271,275 B2
(45) Date of Patent: Mar. 8, 2022

(54) BATTERY PACK

(71) Applicant: Samsung SDI Co., Ltd., Yongin-si (KR)

(72) Inventors: Eunjoong Lee, Yongin-si (KR); Daehyeong Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 10 days.

(21) Appl. No.: 16/345,938

(22) PCT Filed: Oct. 27, 2017

(86) PCT No.: PCT/KR2017/012025
§ 371 (c)(1),
(2) Date: Apr. 29, 2019

(87) PCT Pub. No.: WO2018/080242
PCT Pub. Date: May 3, 2018

(65) Prior Publication Data
US 2020/0067067 A1    Feb. 27, 2020

(30) Foreign Application Priority Data

Oct. 31, 2016   (KR) .................... 10-2016-0143430

(51) Int. Cl.
*H01M 50/581*    (2021.01)
*H01M 10/42*    (2006.01)
*H01M 50/531*    (2021.01)

(52) U.S. Cl.
CPC ....... *H01M 50/581* (2021.01); *H01M 10/425* (2013.01); *H01M 50/531* (2021.01); *H01M 2010/4271* (2013.01); *H01M 2200/10* (2013.01)

(58) Field of Classification Search
None
See application file for complete search history.

(56) References Cited

U.S. PATENT DOCUMENTS 9,196,894 B2    11/2015    Baek
9,331,313 B2    5/2016    Bang et al.
(Continued)

FOREIGN PATENT DOCUMENTS

CN         1767232 A      5/2006
CN       102742043 A     10/2012
(Continued)

OTHER PUBLICATIONS

Kim (KR 20130088111) (a raw machine translation) (Abstract) (Aug. 7, 2013) (Year: 2013).*
(Continued)

*Primary Examiner* — Carmen V Lyles-Irving
(74) *Attorney, Agent, or Firm* — Lewis Roca Rothgerber Christie LLP

(57) ABSTRACT

An embodiment of the present disclosure provides a battery pack including: a battery cell including an electrode assembly and a casing, the casing accommodating the electrode assembly therein and forming a terrace from which an electrode tab electrically connected to the electrode assembly protrudes; a protective circuit module seated on the terrace, the protective circuit module including a thermal cut-off member located on a side of the terrace and a connection tab electrically connected to the electrode tab; and insulating tape located between the battery cell and the protective circuit module, wherein the insulating tape provides insulation between the electrode tab and the protective circuit module and between the terrace and the thermal cut-off member.

11 Claims, 4 Drawing Sheets

(56) References Cited

U.S. PATENT DOCUMENTS

| | | | |
|---|---|---|---|
| 9,356,262 B2 | 5/2016 | Kim et al. | |
| 9,786,958 B2 | 10/2017 | Hwang | |
| 9,917,294 B2 | 3/2018 | Bang et al. | |
| 2006/0093896 A1 | 5/2006 | Hong et al. | |
| 2013/0059171 A1 | 3/2013 | Kim et al. | |
| 2013/0157084 A1* | 6/2013 | Bang | H01M 2/34 429/7 |
| 2014/0193670 A1* | 7/2014 | Ahn | H01M 2/08 429/7 |
| 2014/0212697 A1 | 7/2014 | Wang et al. | |
| 2015/0050523 A1* | 2/2015 | Lee | H01M 2/0212 429/7 |
| 2015/0357689 A1 | 12/2015 | Park | |
| 2016/0211493 A1 | 7/2016 | Kim et al. | |
| 2016/0218533 A1 | 7/2016 | Lim et al. | |
| 2016/0233470 A1 | 8/2016 | Kim et al. | |
| 2016/0233479 A1 | 8/2016 | Ahn et al. | |

FOREIGN PATENT DOCUMENTS

| | | |
|---|---|---|
| CN | 102906903 A | 1/2013 |
| CN | 103972459 A | 8/2014 |
| CN | 105264689 A | 1/2016 |
| KR | 10-1209461 B1 | 12/2012 |
| KR | 10-1232783 B1 | 2/2013 |
| KR | 10-2013-0088111 A | 8/2013 |
| KR | 10-2013-0138110 A | 12/2013 |
| KR | 10-2015-0002138 A | 1/2015 |
| KR | 10-2015-0027579 A | 3/2015 |
| KR | 10-2015-0037222 A | 4/2015 |
| KR | 10-2015-0141472 A | 12/2015 |
| KR | 10-1650027 B1 | 8/2016 |

OTHER PUBLICATIONS

Kim (KR 20130088111) (a raw machine translation) (Detailed Description) (Aug. 7, 2013) (Year: 2013).*
Kim (KR 20130088111) (a raw machine translation) (Fig. 2) (Aug. 7, 2013) (Year: 2013).*
Kim (KR 20130088111) (a raw machine translation) (Fig. 4) (Aug. 7, 2013) (Year: 2013).*
Kim (KR 20130088111) (a raw machine translation) (Fig. 5) (Aug. 7, 2013) (Year: 2013).*
International Search Report for International Application No. PCT/KR2017/012025, dated Feb. 2, 2018, 5pp.
Written Opinion for International Application No. PCT/KR2017/012025, dated Feb. 2, 2018, 6pp.
Chinese Office Action in corresponding Chinese Patent Application No. 201780067961.6, Chinese Office Action dated May 17, 2021 (7 pgs.).
English Translation of Chinese Office Action in corresponding Chinese Patent Application No. 201780067961.6, Chinese Office action dated May 17, 2021 (12 pgs.).
Korean Registration Determination Certificate dated Sep. 8, 2020, issued in corresponding Korean Patent Application No. 10-2016-0143430 (6 pages).
Chinese Office action dated Nov. 19, 2021 issued in corresponding CN Application No. 201780067961.6, 8 pages, with English translation, 12 pages.

* cited by examiner

BATTERY PACK

CROSS-REFERENCE TO RELATED APPLICATION(S)

This application is a National Phase Patent Application of International Patent Application Number PCT/KR2017/012025, filed on Oct. 27, 2017, which claims priority of Korean Patent Application No. 10-2016-0143430, filed Oct. 31, 2016. The entire contents of both of which are incorporated herein by reference.

TECHNICAL FIELD

Embodiments of the present disclosure relate to a battery pack.

BACKGROUND ART

Along with the development of wireless Internet and communication technology, the use of portable computers such as tablet personal computers (PCs) or laptop computers equipped with batteries instead of other power supplies has become widespread. Portable computers are small, easy-to-carry, and have excellent mobility, and thus are widely used for business and personal use.

Portable computers including built-in battery packs may be freely used even when a power outlet is not available. A battery pack in which many rechargeable battery cells are electrically connected to each other in the form of a module may function as a high-capacity, high-power power supply. In this case, the battery pack may include a protective circuit module for electrically connecting the battery cells and controlling charging and discharging operations of the battery cells.

The above-described background art is technical information that the inventors had or learned when or while deriving embodiments of the present disclosure and may not have been publicly known before the filing of the present patent application.

DESCRIPTION OF EMBODIMENTS

Technical Problem

Embodiments of the present disclosure provide battery packs configured to prevent an electrical short circuit and physical breakage by improving the connection structure between battery cells and a protective circuit module.

Solution to Problem

An embodiment of the present disclosure provides a battery pack including: a battery cell including an electrode assembly and a casing, the casing accommodating the electrode assembly therein and forming a terrace from which an electrode tab electrically connected to the electrode assembly protrudes; a protective circuit module seated on the terrace, the protective circuit module including a thermal cut-off member located on a side of the terrace and a connection tab electrically connected to the electrode tab; and insulating tape located between the battery cell and the protective circuit module, wherein the insulating tape provides insulation between the electrode tab and the protective circuit module and between the terrace and the thermal cut-off member.

Advantageous Effects of Disclosure

According to embodiments of the present disclosure, the battery pack may be prevented from being electrically short-circuited or physically broken owing to an improved connection structure between the battery cell and the protective circuit module.

However, the scope of the present disclosure is not limited thereto.

BEST MODE

Figure 1:
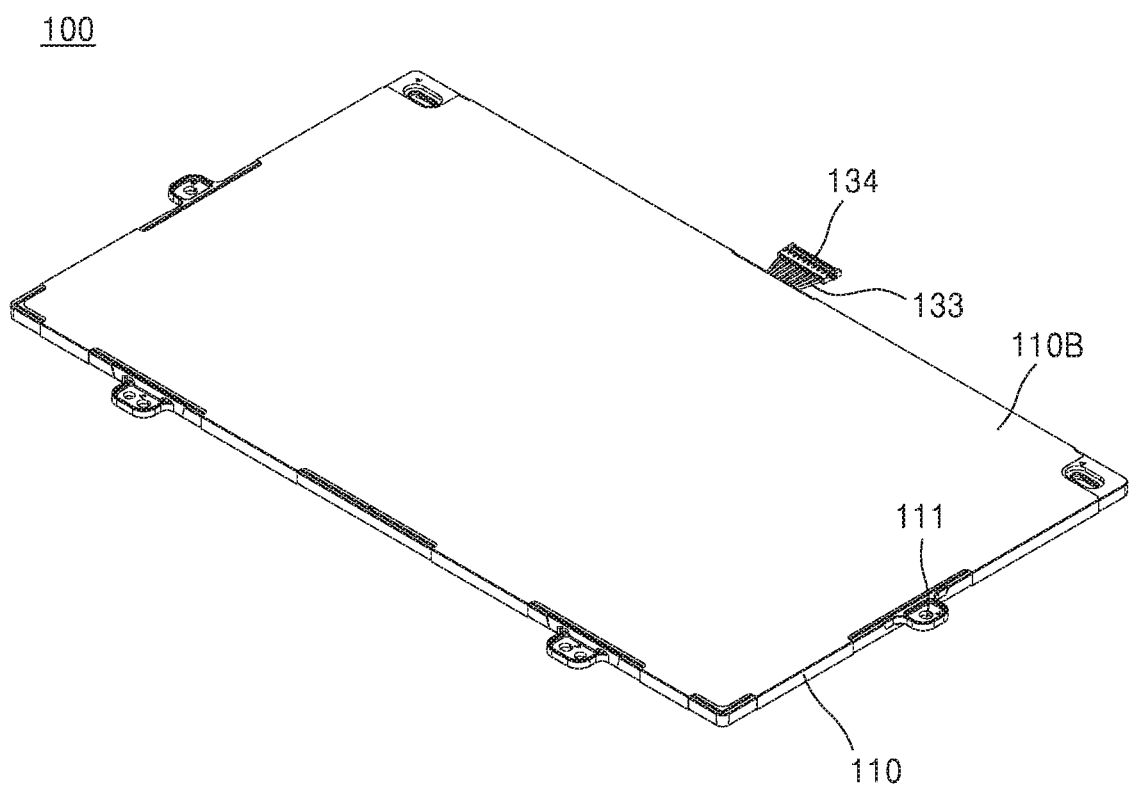
FIG. 1 is a perspective view illustrating a battery pack according to an embodiment of the present disclosure.

According to an embodiment of the present disclosure, a battery pack may include: a battery cell including an electrode assembly and a casing, the casing accommodating the electrode assembly therein and forming a terrace from which an electrode tab electrically connected to the electrode assembly protrudes; a protective circuit module seated on the terrace, the protective circuit module including a thermal cut-off member located on a side of the terrace and a connection tab electrically connected to the electrode tab; and insulating tape located between the battery cell and the protective circuit module, wherein the insulating tape may provide insulation between the electrode tab and the protective circuit module and between the terrace and the thermal cut-off member.

In the embodiment, the protective circuit module may include: a first sub-protective circuit module adjacent to the terrace; and a second sub-protective circuit module connected to the first sub-protective circuit module and extending in a direction away from the terrace, wherein the thermal cut-off member may be provided on the first sub-protective circuit module, and the connection tab may be provided on the second sub-protective circuit module.

In the embodiment, the insulating tape may cover a first surface of the protective circuit module located on a side of the terrace and a second surface of the protective circuit module located on a side of the casing.

In the embodiment, the insulating tape may cover a third surface which is opposite the first surface.

In the embodiment, the electrode tab may include: a first sub-electrode tab located at a side of the first sub-protective circuit module; and a second sub-electrode tab located at a side of the second sub-protective circuit module, wherein the insulating tape may be located between the first sub-protective circuit module and the first sub-electrode tab.

In the embodiment, the second sub-electrode tab may be electrically connected to the connection tab.

In the embodiment, the battery cell may include a first sub-battery cell and a second sub-battery cell arranged side by side in a length direction of the protective circuit module.

In the embodiment, an electrode tab of the first sub-battery cell and an electrode tab of the second sub-battery cell may protrude in a same direction.

In the embodiment, the battery cell may be a pouch-type secondary battery.

In the embodiment, the battery pack may further include a housing sealing the battery cell, the protective circuit module, and the insulating tape.

In the embodiment, the housing may include at least one coupling hole, and the housing may be coupled to a separate set device via a fastening member inserted in the at least one coupling hole.

Other aspects and characteristics will become apparent and more readily appreciated from the accompanying drawings, claims, and detailed description.

MODE OF DISCLOSURE

The present disclosure may be variously modified, and various embodiments may be provided according to the present disclosure. Hereinafter, some embodiments will be illustrated in the accompanying drawings and described in detail. Effects and features of the present disclosure, and implementation methods thereof will be clarified through the following embodiments described in detail with reference to the accompanying drawings. However, the present disclosure is not limited to the following embodiments but may be implemented in various forms.

In the following embodiments, it will be understood that although terms such "first" and "second," are used to describe various elements, these elements should not be limited by these terms. These terms are only used to distinguish one element from another. The terms of a singular form may include plural forms unless referred to the contrary.

In addition, terms such as "include" or "comprise" specify features or the presence of stated elements, but do not exclude other features or elements.

In the drawings, the sizes of elements may be exaggerated for clarity. For example, in the drawings, the size or thickness of each element may be arbitrarily shown for illustrative purposes, and thus the present disclosure should not be construed as being limited thereto.

Hereinafter, embodiments of the present disclosure will be described in detail with reference to the accompanying drawings. In the following description given with reference to the accompanying drawings, the same elements or corresponding elements are denoted with the same reference numerals, and overlapping descriptions thereof will be omitted.

Figure 2:
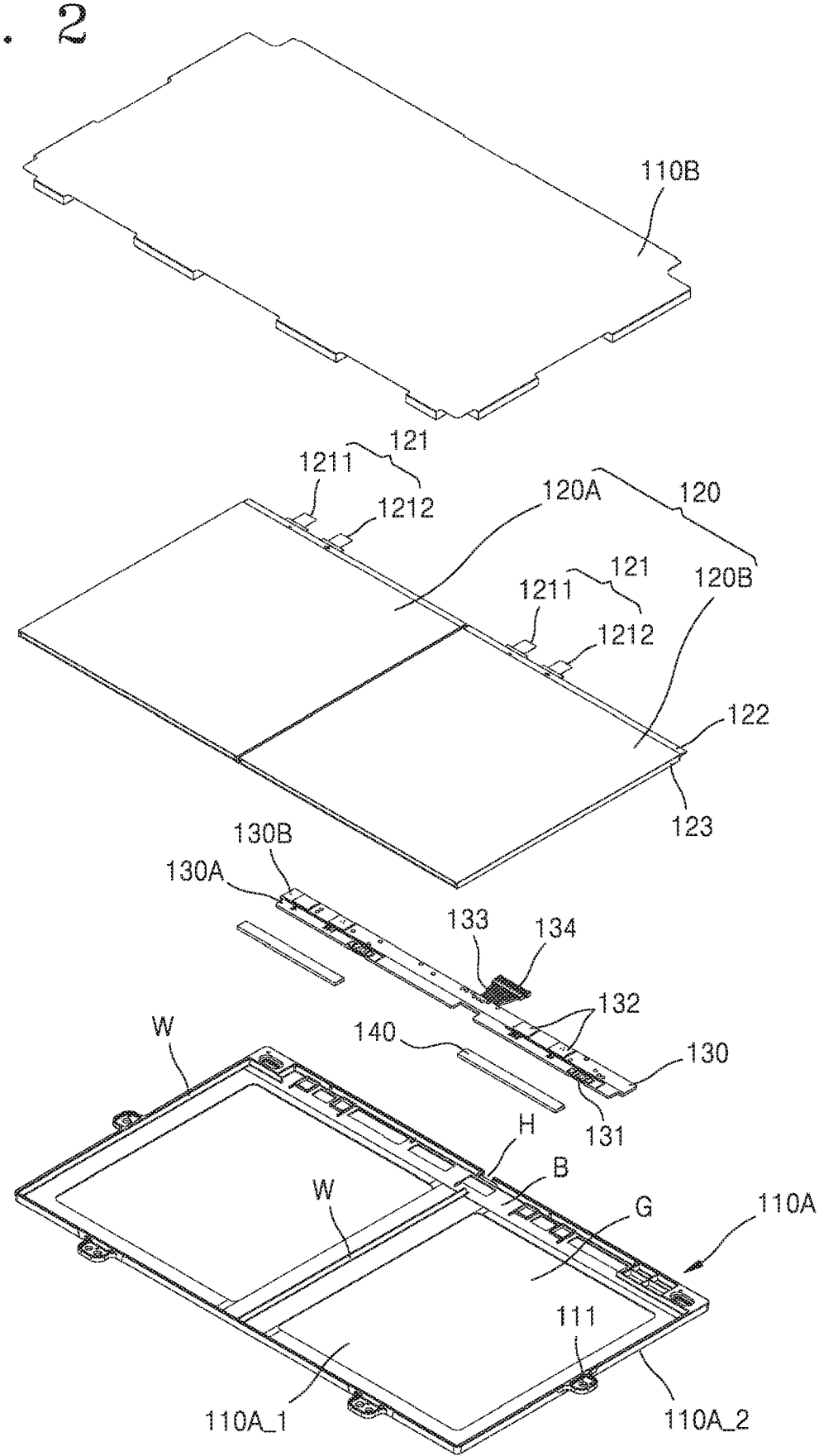
FIG. 2 is an exploded perspective view schematically illustrating the battery pack illustrated in FIG. 1.

FIG. 1 is a perspective view illustrating a battery pack according to an embodiment of the present disclosure, and FIG. 2 is an exploded perspective view illustrating the battery pack shown in FIG. 1.

Referring to FIGS. 1 and 2, a battery pack 100 may include a housing 110, battery cells 120, a protective circuit module 130, and insulating tape 140.

The housing 110 may include a frame 110A and an insulating plate 110B.

The frame 110A may form the framework of the entire battery pack 100 and may seal the battery cells 120, the protective circuit module 130, and the insulating tape 140. That is, the frame 110A may fix and support the battery cells 120 and the protective circuit module 130, and as shown in the drawings, the frame 110A may support one or more battery cells 120. In addition, one or more coupling holes 111 may be formed in the frame 110A, and additional fastening members (not shown) may be inserted into the coupling holes 111 to connect the battery pack 100 to a separate set device.

Cell rests G may be formed on the frame 110A for accommodating the battery cells 120. The cell rests G may have a concave recess shape and may define installation positions of the battery cells 120. For example, partition walls W may be formed along edges of the cell rests G and between the battery cells 120 such that the battery cells 120 may be accommodated with the edges of the battery cell 120 being surrounded by the partition walls W.

In addition, a circuit rest B may be formed on the frame 110A to accommodate the protective circuit module 130 and the insulating tape 140. The circuit rest B may have a recess shape corresponding to the shape of the protective circuit module 130.

For example, the circuit rest B may be formed in a side of the frame 110A, and one or more cell rests G may be formed in a length direction of the circuit rest B. In FIG. 2, two cell rests G are formed in the length direction of the circuit rest B. However, embodiments of the present disclosure are not limited thereto. For example, a single cell rest G or three or more cell rests G may be formed along the circuit rest B. However, the following description will be presented mainly for the case in which two cell rests G are formed along one circuit rest B.

Although not shown in the drawings, strength reinforcing portions (not shown) may be formed on the frame 110A. The strength reinforcing portions may include a plurality of ribs. For example, the strength reinforcing portions may include a plurality of ribs extending side by side on a surface of the frame 110A in one direction. The strength reinforcing portions enable reducing the weight of the frame 110A while guaranteeing sufficient mechanical rigidity of the frame 110A for resisting against bending or twisting.

For example, the partition walls W may be formed along edges of the frame 110A, or may extend across the frame 110A to serve as strength reinforcing portions for reinforcing the mechanical strength of the frame 110A. The frame 110A may be formed of an insulative resin by an injection molding method.

The frame 110A may include a first surface 110A_1 and a second surface 110A_2, and the battery cells 120, the protective circuit module 130, and the insulating tape 140 may be assembled together on the first surface 110A_1. For example, the first surface 110A_1 and the second surface 110A_2 of the frame 110A may mean main surfaces of the frame 110A and may occupy the largest areas of the frame 110A having an approximately rectangular parallelepiped shape.

The battery pack 100 illustrated in FIGS. 1 and 2 may include the insulating plate 110B arranged to cover the first surface 110A_1 of the frame 110A. The insulating plate 110B may cover the first surface 110A_1 of the frame 110A such that the battery cells 120 may not be separated from the frame 110A. For example, after the battery cells 120 are placed on the frame 110A, the insulating plate 110B may be located to cover the battery cells 120, and thus the battery cells 120 may be prevented from being separated from the frame 110A. Therefore, the positions of the battery cells 120 on the frame 110A may be securely fixed owing to the insulating plate 110B placed above the first surface 110A_1 of the frame 110A.

The insulating plate 110B may be coupled or bonded to the frame 110A. The insulating plate 110B may be formed in a plate shape by using an insulative material such as polyethylene terephthalate (PET).

Each of the battery cell 120 may include: an electrode assembly (not shown); and a casing 123 that accommodates the electrode assembly therein and includes a terrace 122 from which an electrode tab 121 electrically connected to the electrode assembly protrude. Here, the casing 123 may be a kind of pouch, and thus the battery pack 100 may be made up of pouch-type secondary battery cells.

For example, the electrode assembly may be manufactured by forming a stack including a positive electrode plate coated with a positive electrode active material, a negative electrode plate coated with a negative electrode active material, and a separator placed between the positive and negative electrode plates, and winding the stack in the form of a jelly roll. Alternatively, the electrode assembly may be manufactured by repeatedly stacking a positive electrode plate, a separator, and a negative electrode plate.

The electrode tab 121 may be electrically connected to the electrode assembly and may protrude from the terrace 122. In detail, the electrode tab 121 may include first and second electrode tabs 1211 and 1212 having different polarities. The first and second electrode tabs 1211 and 1212 may protrude outward from a side of the battery cell 120 and may be electrically connected to the protective circuit module 130 as described later. Hereinafter, the first and second electrode tabs 1211 and 1212 may be collectively referred to as an electrode tab 121. For example, an electrode tab 121 may refer to one or both of the first and second electrode tabs 1211 and 1212.

In addition, the battery cells 120 may be electrically connected in series, parallel, or series-parallel via the protective circuit module 130. That is, the battery cells 120 may be electrically connected as a module by the protective circuit module 130.

For example, the first and second electrode tabs 1211 and 1212 electrically connected to the electrode assembly may protrude from the terrace 122 of each of the battery cells 120. In this case, the protective circuit module 130 may extend along the terraces 122 of the battery cells 120, and the first and second electrode tabs 1211 and 1212 of the battery cells 120 neighboring each other may be electrically connected to each other.

As in the embodiment illustrated in the drawings, the battery cells 120 may be arranged side by side as first and second sub-battery cells 120A and 120B are arranged, and the electrode tabs 121 of the battery cells 120 may extend in the same direction and be collected in the protective circuit module 130.

Although not shown in the drawings, the battery cells 120 may be arranged to face each other, and the protective circuit module 130 may be located between the battery cells 120 facing each other. However, the following description will be presented mainly for the case in which the battery cells 120 are arranged side by side as shown in the drawings.

The protective circuit module 130 may be located on the terraces 122 of the battery cells 120 and may include thermal cut-off members 131 arranged on the terraces 122 and connection tabs 132 electrically connected to the electrode tabs 121. Specifically, the protective circuit module 130 may measure state variables such as temperatures, voltages, or currents of the battery cells 120 for monitoring the operations of the battery cells 120 and may function as a control unit for controlling charging and discharging operations of the battery cells 120 according to monitoring results.

For example, discharge current collected from the battery cells 120 may be input to the protective circuit module 130 and then may be supplied to a set device (not shown). To this end, a connection member 133 may be connected to the protective circuit module 130 to electrically connect the protective circuit module 130 to the set device. For example, the connection member 133 may include a plurality of connection lines.

In addition, the battery cells 120 may be included in the set device as power supplies and may be electrically connected to the set device through the connection member 133 which includes the connection lines for signal and power transmission. To this end, a connector 134 may be connected to an end of the connection member 133 for electric connection to the set device.

In detail, the protective circuit module 130 may include: a first sub-protective circuit module 130A adjacent to the terraces 122 of the battery cells 120; and a second sub-protective circuit module 130B connected to the first sub-protective circuit module 130A and extending in a direction away from the terraces 122. Here, the thermal cut-off members 131 may be provided on the first sub-protective circuit module 130A, and the connection tabs 132 may be provided on the second sub-protective circuit module 130B.

The thermal cut-off members 131 are a kind of thermal fuse installed on the first sub-protective circuit module 130A adjacent to the terraces 122 for sensing the temperatures of the battery cells 120. When the temperatures of the battery cells 120 sensed via the thermal cut-off members 131 exceed a certain threshold value, the thermal cut-off members 131 may interrupt current flowing in a circuit (not shown) of the protective circuit module 130.

The insulating tape 140 is located between the battery cells 120 and the protective circuit module 130 to cover a portion of the protective circuit module 130 and insulate the battery cells 120 from the protective circuit module 130. In detail, the insulating tape 140 may insulate the electrode tabs 121 and the protective circuit module 130 from each other, and the terraces 122 and the thermal cut-off members 131 from each other. The structure of the insulating tape 140 will be described later in detail with reference to FIGS. 3 to 6.

Figure 3:
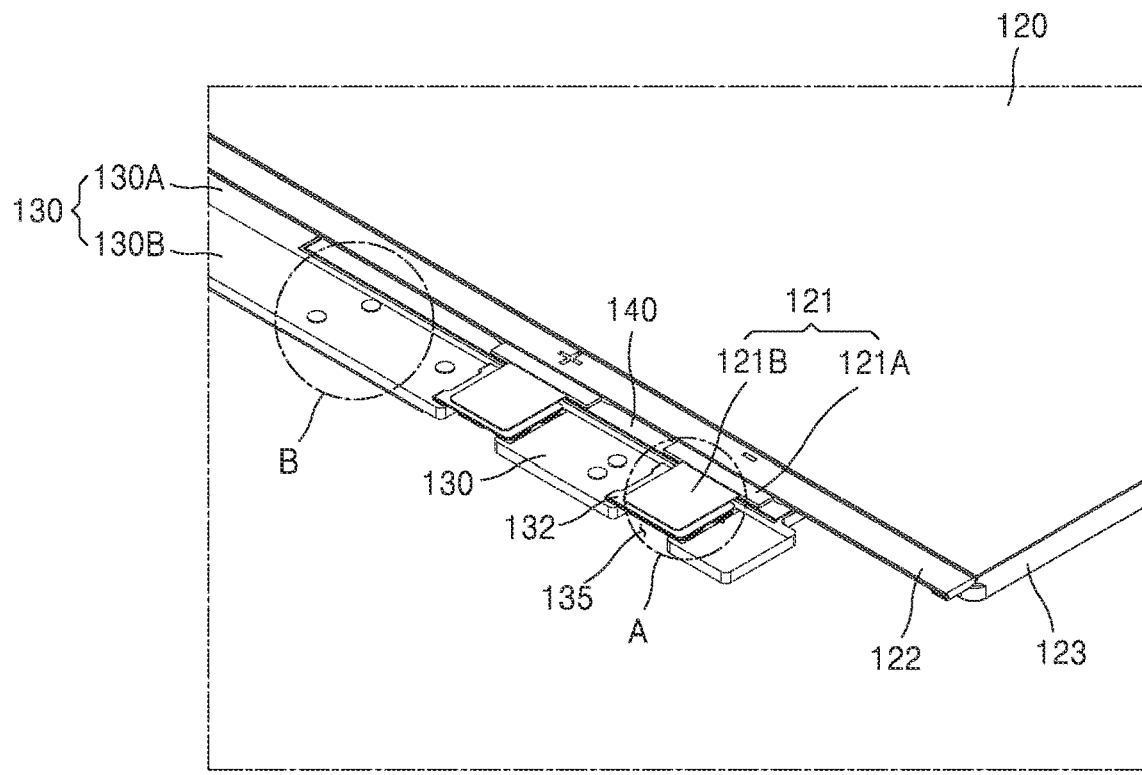
FIG. 3 is a perspective view illustrating a coupling structure between the battery cell, a protective circuit module, and insulating tape shown in FIG. 2.
Figure 4:
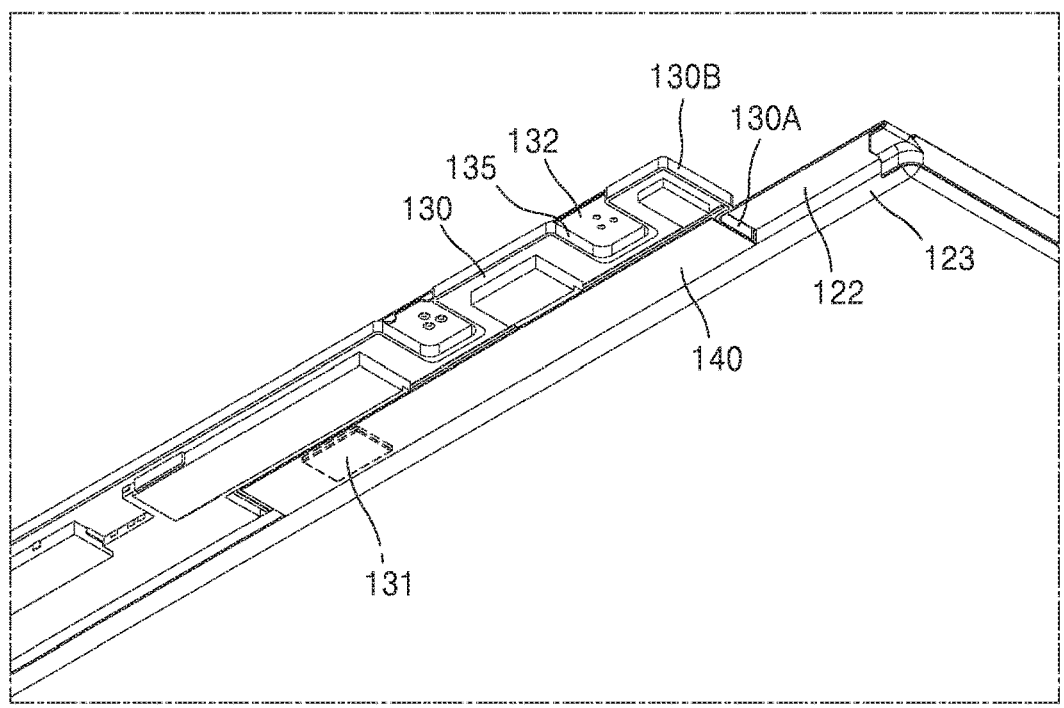
FIG. 4 is a bottom perspective view illustrating the coupling structure between the battery cell, the protective circuit module, and the insulating tape shown in FIG. 3.
Figure 5:
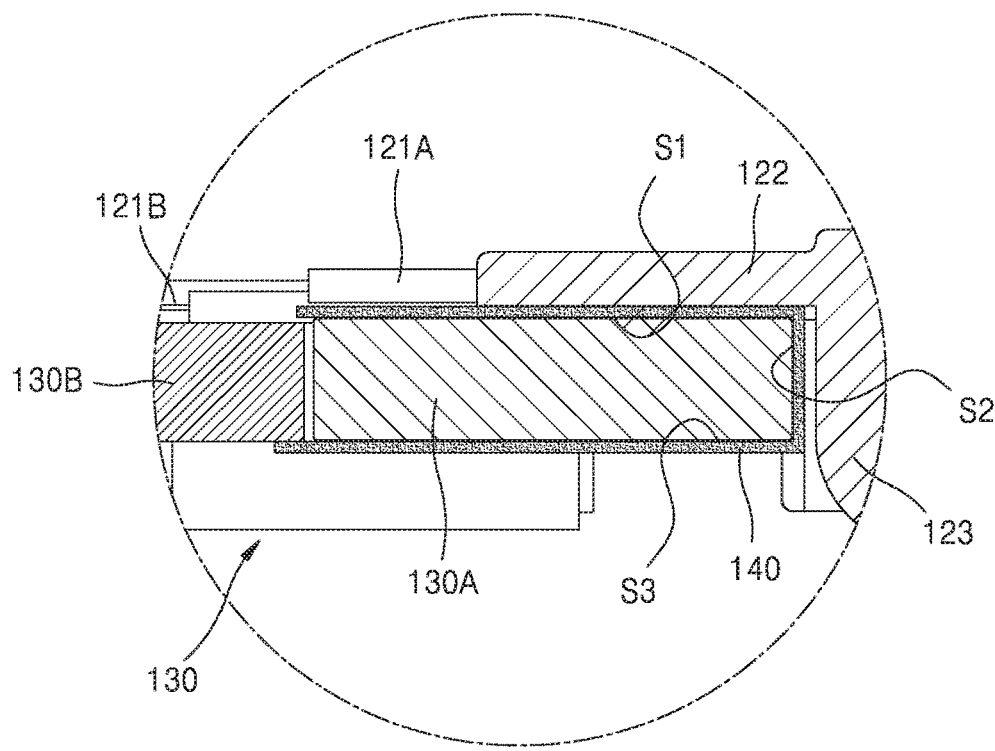
FIG. 5 is a cross-sectional view of A in FIG. 3.
Figure 6:
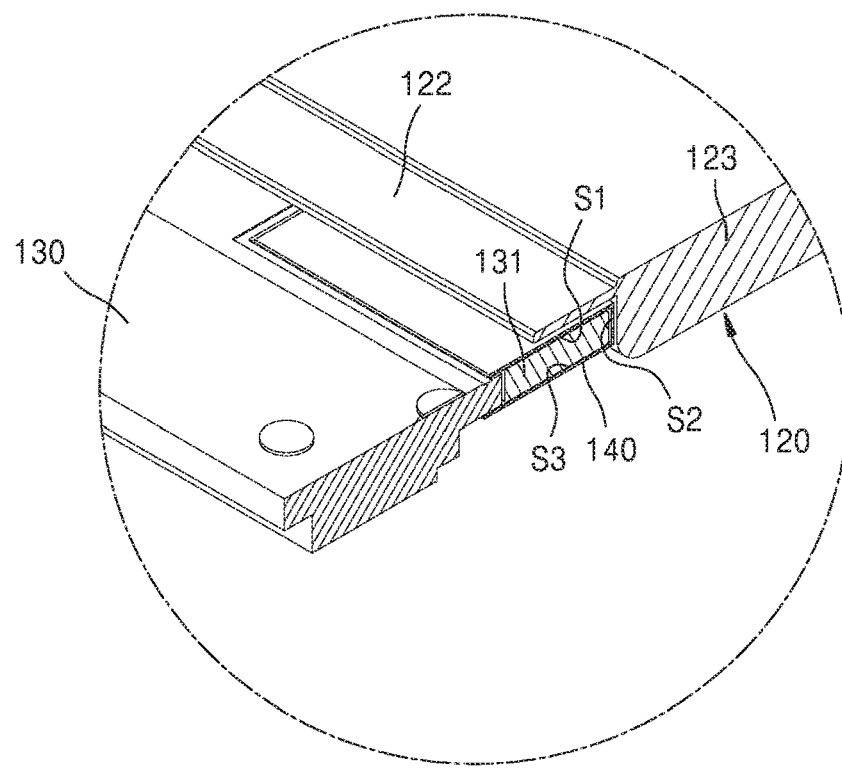
FIG. 6 is a cross-sectional view of B in FIG. 3.

FIG. 3 is a perspective view specifically illustrating a coupling structure among a battery cell 120, the protective circuit module 130, and the insulating tape 140 shown in FIG. 2; FIG. 4 is a bottom perspective view illustrating the coupling structure among the battery cell 120, the protective circuit module 130, and the insulating tape 140 shown in FIG. 3; FIG. 5 is a cross-sectional view of A in FIG. 3; and FIG. 6 is a cross-sectional view of B in FIG. 3.

Referring to FIGS. 3 and 4, the electrode tab 121 of the battery cell 120 may be electrically connected to a connection tab 132 of the protective circuit module 130. For example, the electrode tab 121 of the battery cell 120 may be welded to the connection tab 132 of the protective circuit module 130.

In more detail, the electrode tab 121 of the battery cell 120 may be located on the connection tab 132 of the protective circuit module 130 and may then be welded thereto. In this case, the electrode tab 121 of the battery cell 120 and the connection tab 132 of the protective circuit module 130 may be overlapped with each other and may then be welded together using a welding electrode (not shown). For example, the welding electrode may access welding portions of the electrode tab 121 and the connection tab 132 through upper and lower sides of the electrode tab 121 and the connection tab 132. Specifically, the welding electrode may apply welding current through the upper side of the electrode tab 121 and the lower side of the connection tab 132 exposed downward through a connection hole 135 of the protective circuit module 130.

Since the connection hole 135 of the protective circuit module 130 exposes the connection tab 132 in a downward direction, the welding electrode may access the connection tab 132. For example, the connection tab 132 of the protective circuit module 130 may be provided over the connection hole 135 across the connection hole 135, and the electrode tab 121 of the battery cell 120 may be welded to the connection tab 132.

More specifically, the electrode tab 121 may include a first sub-electrode tab 121A located at a side of the first sub-protective circuit module 130A and a second sub-electrode tab 121B located at a side of the second sub-protective circuit module 130B. Here, the insulating tape 140 may be located between the first sub-protective circuit module 130A and the first sub-electrode tab 121A for insulation therebetween. Structural features of the insulating tape 140 will be described later in detail with reference to FIG. 5.

In addition, the second sub-electrode tab 121B may be electrically connected to the connection tab 132. That is, although it is described that the electrode tab 121 and the connection tab 132 are electrically connected to each other, actually, the first sub-electrode tab 121A may not be in contact with the connection tab 132, but the second sub-electrode tab 121B may be electrically connected to the connection tab 132.

Here, the first sub-electrode tab 121A and the second sub-electrode tab 121B are denoted with different names for ease of illustration. However, actually, the first sub-electrode tab 121A and the second sub-electrode tab 121B form one element and may be collectively referred to as the electrode tab 121.

In addition, referring to FIG. 4, the insulating tape 140 may insulate the terrace 122 of the battery cell 120 from a thermal cut-off member 131. Structural features of the insulating tape 140 will be described below in detail with reference to FIG. 6.

First, the arrangement structure of the insulating tape 140 will be described in view of coupling between the electrode tab 121 and the connection tab 132 with reference to FIG. 5.

Referring to FIG. 5, the insulating tape 140 may cover a first surface S1 of the protective circuit module 130 located on a side of the terrace 122, a second surface S2 of the protective circuit module 130 located on a side of the casing 123 of the battery cell 120, and a third surface S3 of the protective circuit module 130 opposite the first surface S1.

Specifically, the insulating tape 140 may insulate the first sub-electrode tab 121A and the terrace 122 from the first surface S1 of the protective circuit module 130. The first sub-electrode tab 121A is an element having a polarity such as a positive or negative polarity, and if the first sub-electrode tab 121A and the protective circuit module 130 come into contact with each other, an electrical short circuit may occur. That is, since the protective circuit module 130 includes current paths for electrically connecting the battery cells 120 to each other, allowing flows of charging and discharging current of the battery cells 120, or controlling charging and discharging operations of the battery cells 120, it is required to insulate the first sub-electrode tab 121A and the protective circuit module 130 from each other.

In addition, the insulating tape 140 may insulate the terrace 122 and the first surface S1 of the protective circuit module 130 from each other. The insulating tape 140 has a function of insulating the terrace 122 from the protective circuit module 130 and also has a function of preventing an electrical short circuit that may occur as the protective circuit module 130 and the first sub-electrode tab 121A come into contact with each other when the terrace 122 and the protective circuit module 130 touch each other and thus a connection portion (not shown) between the electrode assembly and the first sub-electrode tab 121A buried in the terrace 122 is exposed to the outside.

Due to this necessity, the insulating tape 140 may be located among the first sub-electrode tab 121A, the terrace 122, and the protective circuit module 130, specifically between the terrace 122 and the first sub-protective circuit module 130A located on a side of the terrace 122, to insulate the first sub-electrode tab 121A and the terrace 122 from the first sub-protective circuit module 130A. As described above, since the insulating tape 140 has a function of preventing the first sub-electrode tab 121A and the terrace 122 from making physical contact with the first sub-protective circuit module 130A in addition to having an insulating function, the insulating tape 140 may prevent breakage of the first sub-protective circuit module 130A, the first sub-electrode tab 121A, or the terrace 122 by absorbing an external impact applied thereto.

In addition, the insulating tape 140 may insulate the casing 123 of the battery cell 120 from the second surface S2 of the protective circuit module 130. As described above, since the protective circuit module 130 includes current paths for electrically connecting the battery cells 120 to each other, allowing flows of charging and discharging current of the battery cells 120, or controlling charging and discharging operations of the battery cells 120, it is required to electrically insulate the protective circuit module 130 from the casings 123 of the battery cells 120 in which a plurality of electrode assemblies are accommodated for electrical stability of the battery pack 100.

Due to this necessity, the insulating tape 140 may be located between the casing 123 of the battery cell 120 and the protective circuit module 130, specifically between the casing 123 and the first sub-protective circuit module 130A located on a side of the casing 123, to insulate the casing 123 of the battery cell 120 from the first sub-protective circuit module 130A. As described above, since the insulating tape 140 has a function of preventing the casing 123 of the battery cell 120 from making physical contact with the first sub-protective circuit module 130A in addition to having an insulating function, the insulating tape 140 may prevent breakage of the first sub-protective circuit module 130A or the casing 123 by absorbing an external impact applied thereto.

In addition, the insulating tape 140 may cover the third surface S3 of the protective circuit module 130 which is opposite the first surface S1 of the protective circuit module 130. As described above, since the protective circuit module 130 includes current paths for electrically connecting the battery cells 120 to each other, allowing flows of charging and discharging current of the battery cells 120, or controlling charging and discharging operations of the battery cells 120, the insulating tape 140 covers the third surface S3 of the protective circuit module 130 to prevent the protective circuit module 130 from making contact with the circuit rest B of the frame 110A (shown in FIG. 2) placed on a side of the third surface S3 of the protective circuit module 130. In addition, the insulating tape 140 may protect the third surface S3 of the protective circuit module 130 from an external impact.

Next, the structure in which the insulating tape 140 surrounds the thermal cut-off member 131 provided on the protective circuit module 130 will be described in detail with reference to FIG. 6.

Referring to FIG. 6, the insulating tape 140 may cover a first surface S1 of the thermal cut-off member 131 located on a side of the terrace 122, a second surface S2 of the thermal cut-off member 131 located on a side of the casing 123 of the battery cell 120, and a third surface S3 of the thermal cut-off member 131 opposite the first surface S1.

Here, since the thermal cut-off member 131 is an element included in the protective circuit module 130 and is located at the same position as the first sub-protective circuit module 130A as shown in FIG. 5, the surfaces of the thermal cut-off member 131 are denoted with the same reference numbers as the first surface S1, the second surface S2, and the third surface S3 of the protective circuit module 130.

Specifically, the insulating tape 140 may insulate the terrace 122 of the battery cell 120 from the first surface S1 of the thermal cut-off member 131. As described above, the thermal cut-off member 131 is an element that interrupts current flowing in the protective circuit module 130 when the amount of heat generated from the battery cell 120 exceeds a certain threshold value. If the thermal cut-off member 131 and the terrace 122 are in contact with each other, there is a risk of an electrical short circuit occurring. In addition, there is a risk that the terrace 122 or the thermal cut-off members 131 is broken as the terrace 122 and the thermal cut-off member 131 come into contact with each other due to an external impact.

Therefore, the insulating tape 140 may insulate the terrace 122 of the battery cell 120 from the first surface S1 of the thermal cut-off member 131 to prevent an electrical short circuit between the terrace 122 and the thermal cut-off member 131 and breakage of the terrace 122 or the thermal cut-off member 131 caused by physical contact therebetween.

In addition, the insulating tape 140 may insulate the casing 123 of the battery cell 120 from the second surface S2 of the thermal cut-off member 131. As described above, the thermal cut-off member 131 is an element that interrupts current flowing in the protective circuit module 130 when the amount of heat generated from the battery cell 120 exceeds a certain threshold value. If the thermal cut-off member 131 and the casing 123 come into contact with each other, there is a risk of an electrical short circuit occurring. Therefore, the insulating tape 140 may insulate the casing 123 of the battery cell 120 from the second surface S2 of the thermal cut-off member 131 for electrical stability of the battery pack 100.

As described above, since the insulating tape 140 has a function of preventing the casing 123 of the battery cell 120 from making physical contact with the protective circuit module 130 in addition to having an insulating function, the insulating tape 140 may prevent breakage of the protective circuit module 130 or the casing 123 by absorbing an external impact applied thereto.

In addition, the insulating tape 140 may cover the third surface S3 of the thermal cut-off member 131 which is opposite the first surface S1 of the thermal cut-off member 131. As described above, since the thermal cut-off member 131 interrupts current flowing in the protective circuit module 130 when the amount of heat generated from the battery cell 120 exceeds a certain threshold value, the insulating tape 140 covers the third surface S3 of the thermal cut-off member 131 to prevent the thermal cut-off member 131 from making contact with the circuit rest B of the frame 110A (shown in FIG. 2) placed on a side of the third surface S3 of the thermal cut-off member 131. In addition, the insulating tape 140 may protect the third surface S3 of the thermal cut-off member 131 from an external impact.

While embodiments of the present disclosure have been described with reference to the accompanying drawings, these embodiments are for illustrative purposes only, and it will be understood by those of ordinary skill in the art that various changes and modifications may be made therefrom. Therefore, the scope and spirit of the present disclosure should be defined by the following claims.

INDUSTRIAL APPLICABILITY

As described above, according to the embodiments of the present disclosure, the coupling between the battery cells and the protective circuit module may be improved, and thus the battery pack may have improved quality. Specifically, since the insulating tape is located between the electrode tabs and the protective circuit module and between the terraces and the thermal cut-off members, these elements may be prevented from being short circuited or broken by an external impact, and the temperature of the battery cells may be smoothly detected.

The invention claimed is:

1. A battery pack comprising:
   a battery cell comprising an electrode assembly and a casing, the casing accommodating the electrode assembly therein and forming a terrace from which an electrode tab electrically connected to the electrode assembly protrudes in a direction away from the terrace, the direction away from the terrace being a lengthwise direction of the battery cell;
   a protective circuit module seated on the terrace, the protective circuit module comprising a thermal cut-off member located on a side of the terrace and a connection tab electrically connected to the electrode tab, the electrode tab being physically connected to the protective circuit module at the connection tab; and
   insulating tape located between the battery cell and the protective circuit module,
   wherein the connection tab is spaced from the thermal cut-off member in the direction away from the terrace,
   wherein the insulating tape covers the thermal cut-off member while exposing the connection tab and provides insulation
   i) between the electrode tab and the protective circuit module and
   ii) between the terrace and the thermal cut-off member,
   wherein the electrode tab is welded to the connection tab.

2. The battery pack of claim 1, wherein the protective circuit module comprises:
   a first sub-protective circuit module adjacent to the terrace; and
   a second sub-protective circuit module connected to the first sub-protective circuit module and extending in the direction away from the terrace,
   wherein the thermal cut-off member is provided on the first sub-protective circuit module, and
   the connection tab is provided on the second sub-protective circuit module.

3. The battery pack of claim 1, wherein the insulating tape covers a first surface of the protective circuit module located on a side of the terrace and a second surface of the protective circuit module located on a side of the casing.

4. The battery pack of claim 3, wherein the insulating tape covers a third surface of the protective circuit module which is opposite the first surface.

5. The battery pack of claim 2, wherein the electrode tab comprises:
   a first sub-electrode tab located at a side of the first sub-protective circuit module; and a second sub-electrode tab located at a side of the second sub-protective circuit module, wherein the insulating tape is located between the first sub-protective circuit module and the first sub-electrode tab.

6. The battery pack of claim 5, wherein the second sub-electrode tab is electrically connected to the connection tab.

7. The battery pack of claim 1, wherein the battery cell comprises a first sub-battery cell and a second sub-battery cell arranged side by side in a length direction of the protective circuit module.

8. The battery pack of claim 7, wherein an electrode tab of the first sub-battery cell and an electrode tab of the second sub-battery cell protrude in a same direction.

9. The battery pack of claim 1, wherein the battery cell is a pouch-type secondary battery.

10. The battery pack of claim 1, further comprising a housing sealing the battery cell, the protective circuit module, and the insulating tape.

11. The battery pack of claim 10, wherein the housing comprises at least one coupling hole.

\* \* \* \* \*